(12) United States Patent
Huang et al.

(10) Patent No.: US 10,845,638 B2
(45) Date of Patent: Nov. 24, 2020

(54) COLOR FILM SUBSTRATE, FLEXIBLE LIQUID CRYSTAL DISPLAY PANEL AND PREPARATION METHOD

(71) Applicant: Wuhan China Star Optoelectronics Technology Co., Ltd., Wuhan (CN)

(72) Inventors: Jianlong Huang, Wuhan (CN); Wei Tang, Wuhan (CN)

(73) Assignee: Wuhan China Star Optoelectronics Technology Co., Ltd., Wuhan (CN)

( * ) Notice: Subject to any disclaimer, the term of this patent is extended or adjusted under 35 U.S.C. 154(b) by 0 days.

(21) Appl. No.: 16/472,913

(22) PCT Filed: Apr. 10, 2019

(86) PCT No.: PCT/CN2019/082011
§ 371 (c)(1),
(2) Date: Jun. 24, 2019

(87) PCT Pub. No.: WO2020/181604
PCT Pub. Date: Sep. 17, 2020

(65) Prior Publication Data
US 2020/0319501 A1 Oct. 8, 2020

(30) Foreign Application Priority Data

Mar. 12, 2019 (CN) .......................... 2019 1 0182996

(51) Int. Cl.
G02F 1/1335 (2006.01)
G02F 1/1333 (2006.01)
G02F 1/1339 (2006.01)

(52) U.S. Cl.
CPC .... G02F 1/133512 (2013.01); G02F 1/13394 (2013.01); G02F 1/133305 (2013.01);
(Continued)

(58) Field of Classification Search
CPC ......... G02F 1/136209; G02F 1/133512; G02F 1/133305; G02F 1/133514;
(Continued)

(56) References Cited

U.S. PATENT DOCUMENTS

2007/0202709 A1* 8/2007 Roh .................. G02F 1/133504
438/758
2014/0319490 A1* 10/2014 Kim ..................... G02B 5/3033
257/40
(Continued)

FOREIGN PATENT DOCUMENTS

CN 101211119 7/2008
CN 103728765 4/2014
(Continued)

*Primary Examiner* — Jia X Pan

(57) ABSTRACT

The application provides a color film substrate, a flexible liquid crystal display panel and a preparation method. The color film substrate includes a flexible substrate, a photoresist layer, an alignment layer and black matrix walls. By disposing the three-dimensional black matrix walls with liquid crystal-holding chambers on the color film substrate, liquid crystals can be fixed in the holding chambers for avoiding the uneven cell gap caused by the displacement of the liquid crystals. Thus, the application solves the problem that an existing flexible liquid crystal display panel has severe displacement of the liquid crystals under stress.

8 Claims, 5 Drawing Sheets

(52) U.S. Cl.
CPC .. *G02F 1/133377* (2013.01); *G02F 1/133516* (2013.01); *G02F 2001/13396* (2013.01); *G02F 2001/13398* (2013.01)

(58) Field of Classification Search
CPC ........... G02F 1/133377; G02F 1/13394; G02F 2001/13396; G02F 2001/13398; H01L 51/0097; H01L 2251/5338; G09F 9/301
See application file for complete search history.

(56) References Cited

U.S. PATENT DOCUMENTS

| | | | |
|---|---|---|---|
| 2015/0146145 A1* | 5/2015 | Zhong | G02F 1/13737 349/106 |
| 2015/0177584 A1* | 6/2015 | Shi | G02F 1/153 359/267 |
| 2016/0252768 A1* | 9/2016 | Zhong | G02F 1/13473 349/43 |
| 2016/0291401 A1 | 10/2016 | Cheng et al. | |
| 2017/0139264 A1 | 5/2017 | Fu et al. | |
| 2019/0171053 A1 | 6/2019 | Cao | |
| 2019/0245011 A1* | 8/2019 | Lius | H01L 51/525 |
| 2019/0271877 A1* | 9/2019 | Harrison | H01L 51/5262 |

FOREIGN PATENT DOCUMENTS

| | | |
|---|---|---|
| CN | 103941484 | 7/2014 |
| CN | 104808410 | 7/2015 |
| CN | 107741669 | 2/2018 |
| KR | 2007-0024236 | 3/2007 |

\* cited by examiner

COLOR FILM SUBSTRATE, FLEXIBLE LIQUID CRYSTAL DISPLAY PANEL AND PREPARATION METHOD

RELATED APPLICATIONS

This application is a National Phase of PCT Patent Application No. PCT/CN2019/082011 having International filing date of Apr. 10, 2019, which claims the benefit of priority of Chinese Patent Application No. 201910182996.5 filed on Mar. 12, 2019. The contents of the above applications are all incorporated by reference as if fully set forth herein in their entirety.

FIELD AND BACKGROUND OF THE INVENTION

The present application relates to a manufacturing field of a display device, and more particularly to a color film substrate, a flexible liquid crystal display panel and a preparation method.

In recent years, a flexible display technology has attracted wide attention due to its low power consumption, flexibility and good flexibility.

However, when the flexible LCD panel is always bent, the force exerted on liquid crystal molecules will cause serious deviation of the liquid crystal molecules and cause uneven gaps between liquid crystal cells. This will further affect the display effect of the flexible LCD panel.

Hence, it is an urgent need to solve the problem of serious displacement of the liquid crystal molecules in the existing flexible liquid crystal display panels.

SUMMARY OF THE INVENTION

The present application provides a flexible liquid crystal display panel to solve the technical problem of uneven gaps between liquid crystal cells and a serious color bias after the flexible liquid crystal display panel being bent.

In order to solve the above problems, the technical scheme provided in this application is as follows.

The application provides a color film substrate, comprising:

a flexible substrate;

a photoresist layer, being formed on the flexible substrate;

an alignment layer, being located on one side of the photoresist layer away from the flexible substrate; and black matrix walls, being located on one side of the alignment layer away from the photoresist layer; wherein a height of at least one black matrix wall reaches a threshold height; the black matrix walls constituting a three-dimensional structure and forming holding chambers.

In the color film substrate provided by the application, all the black matrix walls have the same height.

In the color film substrate provided by the application, a height of at least one black matrix wall is less than heights of other black matrix walls.

In the color film substrate provided by the application, the black matrix walls around at least one pixel unit are higher than the black matrix walls between sub-pixels of the pixel unit.

In the color film substrate provided by the application, the black matrix walls around all the pixel units have the same height, and the black matrix walls between the sub-pixels of all the pixel units have the same height.

In the color film substrate provided by the application, the black matrix walls around all the pixel units have the same height; the black matrix walls between the sub-pixels of each pixel unit have the same height; and in at least two pixel units, the black matrix walls between the sub-pixels of the two pixel units have different heights.

In the color film substrate provided by the application, the black matrix walls around all the pixel units have the same height; and in at least one pixel unit, the black matrix walls between the sub-pixels thereof have different heights.

In the color film substrate provided by the application, in all the pixel units, heights of the black matrix walls between two fixed sub-pixels are the same.

In the color film substrate provided by the application, in at least two pixel units, heights of the black matrix walls between two fixed sub-pixels of the two pixel units are different.

In the color film substrate provided by the application, in at least one pixel unit, the height of at least one black matrix wall around the pixel unit is different from that of the other black matrix wall around the pixel unit.

The application further provides a flexible liquid crystal display panel, including an array substrate, a color film substrate and liquid crystals received in holding chambers of black matrix walls of the color film substrate. The color film substrate including:

a flexible substrate;

a photoresist layer, being formed on the flexible substrate;

an alignment layer, being located on one side of the photoresist layer away from the flexible substrate; and the black matrix walls, being located on one side of the alignment layer away from the photoresist layer; wherein at least one black matrix wall has a threshold height; the black matrix walls constituting a three-dimensional structure and forming the holding chambers.

In the flexible liquid crystal display panel provided by the application, all the black matrix walls have the same height.

In the flexible liquid crystal display panel provided by the application, a height of at least one black matrix wall is less than heights of other black matrix walls.

In the flexible liquid crystal display panel provided by the application, the black matrix walls around at least one pixel unit are higher than the black matrix walls between sub-pixels of the pixel unit.

In the flexible liquid crystal display panel provided by the application, the black matrix walls around all the pixel units have the same height, and the black matrix walls between the sub-pixels of all the pixel units have the same height.

In the flexible liquid crystal display panel provided by the application, the black matrix walls around all the pixel units have the same height; the black matrix walls between the sub-pixels of each pixel unit have the same height; and in at least two pixel units, the black matrix walls between the sub-pixels of the two pixel units have different heights.

In the flexible liquid crystal display panel provided by the application, the black matrix walls around all the pixel units have the same height; and in at least one pixel unit, the black matrix walls between the sub-pixels thereof have different heights.

In the flexible liquid crystal display panel provided by the application, in all the pixel units, heights of the black matrix walls between two fixed sub-pixels are the same.

In the flexible liquid crystal display panel provided by the application, in at least two pixel units, heights of the black matrix walls between two fixed sub-pixels of the two pixel units are different.

Moreover, the application further provides a preparing method of a color film substrate, comprising:

providing a flexible substrate;

preparing a photoresist layer on the flexible substrate;
preparing an alignment layer on one side of the photoresist layer away from the flexible substrate; and
preparing black matrix walls on one side of the alignment layer away from the photoresist layer.

The beneficial effects of this application are as follows: the present application provides the color film substrate, the flexible liquid crystal display panel and the preparation method. The color film substrate includes the flexible substrate, the photoresist layer, the alignment layer and the black matrix walls. By disposing the three-dimensional black matrix walls with the liquid crystal-holding chambers on the color film substrate, the liquid crystals can be fixed in the holding chambers, which prevent the random flow and displacement of the liquid crystals and avoid the uneven cell gap caused by the displacement of the liquid crystals. Thus, the application solves the problem that an existing flexible liquid crystal display panel has severe displacement of liquid crystals under stress.

BRIEF DESCRIPTION OF THE SPECIFIC VIEWS OF THE DRAWINGS

For more clearly illustrating the technical scheme in the embodiment of the present application or the prior art, the following text will briefly introduce the accompanying drawings used in the embodiment or the prior art. It is obvious that the accompanying drawings in the following description are only some embodiments of the present application. For the technical personnel of the field, other drawings can also be obtained from these drawings without paying creative work.

Figure 9:
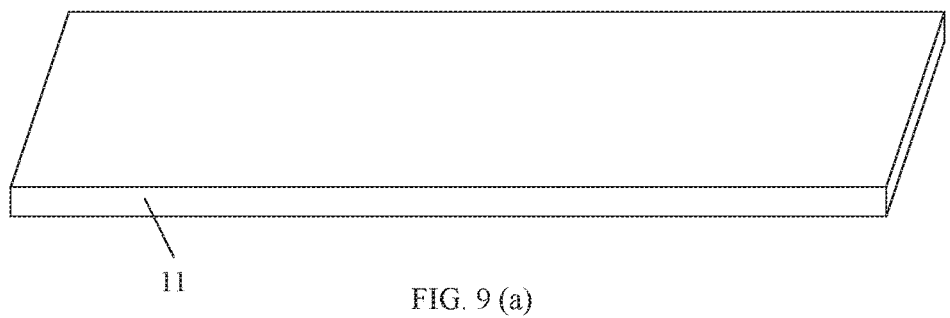
Figure 9:
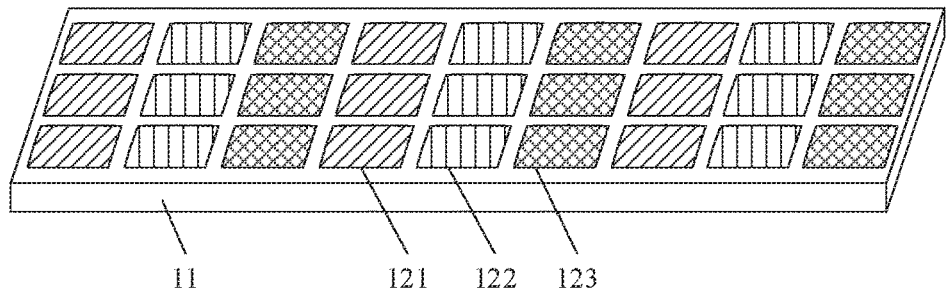
Figure 9:
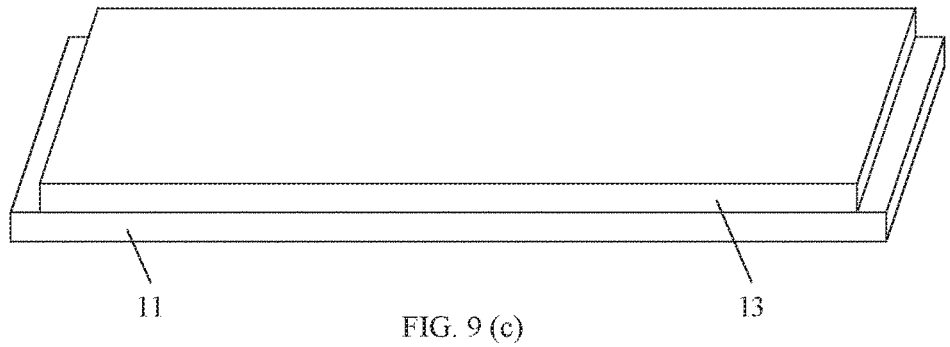
Figure 9:
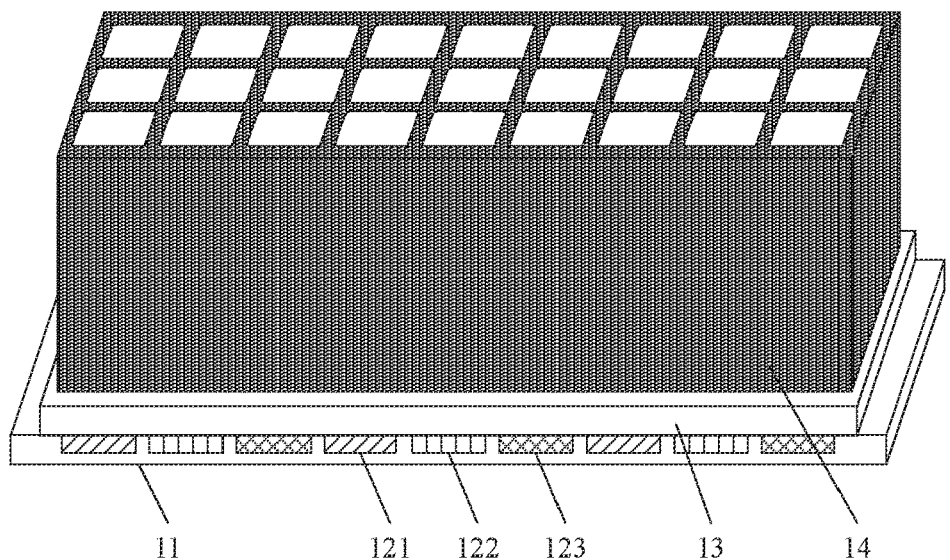
Figure 10:
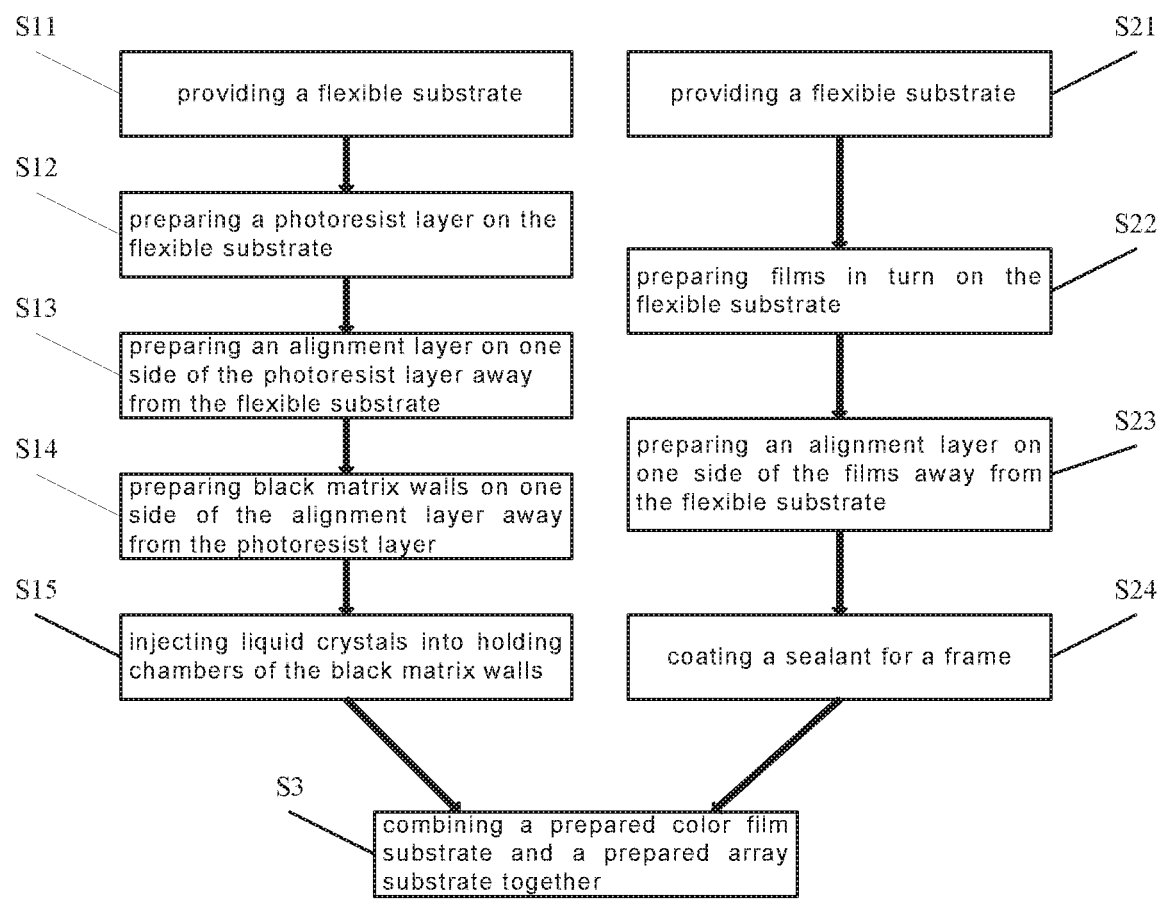

FIGS. 9(a), 9(b), 9(c) and 9(d) are structure schematic views for preparing the color film substrate provided by one embodiment of the present application; and FIG. 10 is a flow chart for preparing the flexible liquid crystal display panel provided by one embodiment of the present application.

DESCRIPTION OF SPECIFIC EMBODIMENTS OF THE INVENTION

The following will give a clear and complete description of the implementation plan of this application and/or the technical solution of the embodiments in the light of specific implementation plans of this application. Obviously, implementations and/or embodiments described below are only part of the implementations and/or the embodiments of this application, not all of them. Based on the implementations and/or embodiments in this application, all other implementations and/or embodiments obtained by ordinary person in the field without paying creative work will fall within the scope of protection of this application.

Directional terms mentioned in the present application, such as "top", "bottom", "front", "back", "left", "right", "inner", "outer", "side" etc., are only used with reference to the orientation of the accompanying drawings. Therefore, the used directional terms are intended to illustrate and understand, but not to limit, the present invention. Moreover, the terms, such as "first" and "second", and the like, are only used to distinguish one entity or operation from another entity or operation, but not understood to instruct or imply the relative importance or implicitly indicate the number of technical characteristics indicated. Further, the features defined by "first" and "second" may explicitly or implicitly include one or more the sorts of features.

In order to solve the problem of serious deviation of the liquid crystal molecules when applying external force in a flexible liquid crystal display panel, this application provides a color film substrate to solve this problem.

Figure 1:
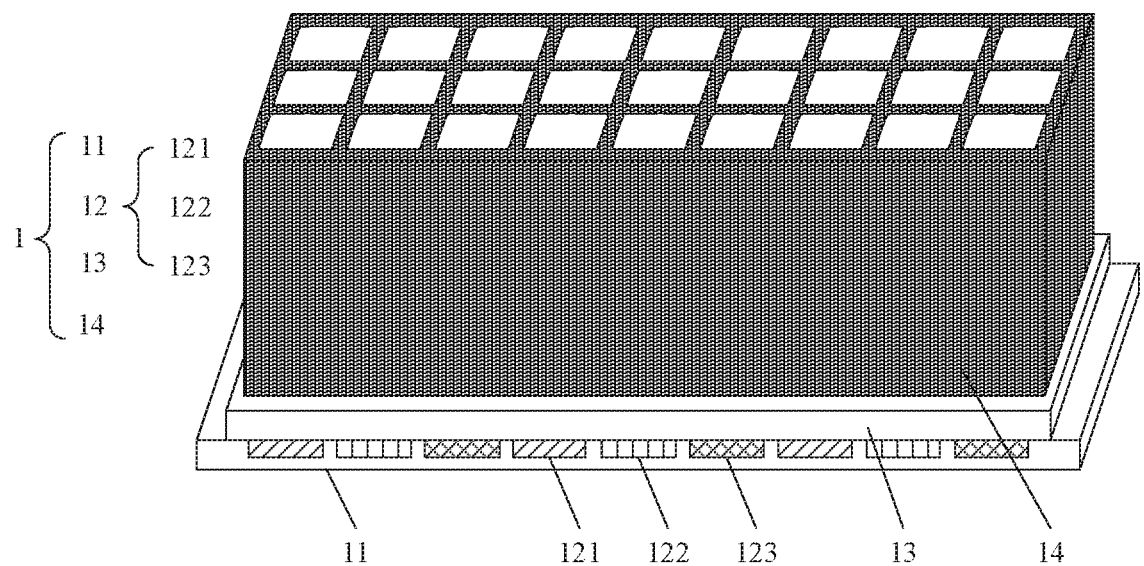
FIG. 1 is a 3D structure schematic view of a color film substrate provided by one embodiment of the present application.

In one embodiment, referring to FIG. 1, the color film substrate 1 provided by the present application includes:

a flexible substrate 11, in one embodiment, the flexible substrate 11 is made of a polymer material;

a photoresist layer 12, formed on the flexible substrate 11 and includes a first sub-pixel 121, a second sub-pixel 122 and a third sub-pixel 123, which are set repeatedly in turn on the same layer;

an alignment layer 13, located on one side of the photoresist layer 12 away from the flexible substrate 11; and black matrix walls 14, located on one side of the alignment layer 13 away from the photoresist layer 12; wherein a height of at least one of the black matrix walls reaches a threshold value; the black matrix walls 14 constitute a three-dimensional honeycomb-like structure, and form multiple holding chambers for accommodating liquid crystals.

The application provides a color film substrate, including the flexible substrate, the photoresist layer, the alignment layer and the black matrix walls. By disposing the three-dimensional black matrix walls with the liquid crystal-holding chambers on the color film substrate, the liquid crystals can be fixed in the holding chambers, for preventing the random flow and displacement of liquid crystals and avoiding the uneven cell gap caused by the displacement of liquid crystals. Thus, the application solves the problem that an existing flexible liquid crystal display panel has severe displacement of liquid crystals under stress.

The ability of the black matrix walls to fix the liquid crystals, the supporting effect on an array substrate and the color film substrate in the liquid crystal display panel, and the blocking effect on the transverse refraction of light are all related to the setting mode of the black matrix walls. The higher and denser the black matrix walls are set, the better the ability of the black matrix walls to fix liquid crystals, the supporting effect on the array substrate and the color film substrate in the liquid crystal display panel and the blocking effect on the transverse refraction of light. Namely, the application solves the problem that the existing flexible liquid crystal display panel has severe displacement of liquid crystals under stress and a serious color bias.

The closer the height of each black matrix wall approaches the threshold value, the stronger the three-dimensional structure of the black matrix walls is, so when the black matrix walls are subjected to external pressure, the better the supporting effect thereof is. Moreover, the smaller spaces limited by the black matrix walls are, the denser the limited spaces are, and the smaller the range of movement and offset of the liquid crystals is, so when the black matrix walls are subjected to external pressure, the better the fixed effect of the black matrix walls on the liquid crystals is. That is, the less the possibility of serious displacement of the liquid crystals under stress is. Furthermore, the higher and denser the black matrix walls are set, the stronger the blocking effect on the transverse refraction of light is, so the more effective it is to solve the problem of color deviation.

FIGS. 2 to 7 correspond to six specific embodiments of the color film substrate of the present application. Wherein a picture (a) of FIGS. 2 to 7 is a front view of the color film substrate in the embodiment, and a picture (b) of FIGS. 2 to 7 is a side view of the color film substrate in the embodiment.

Figure 2:
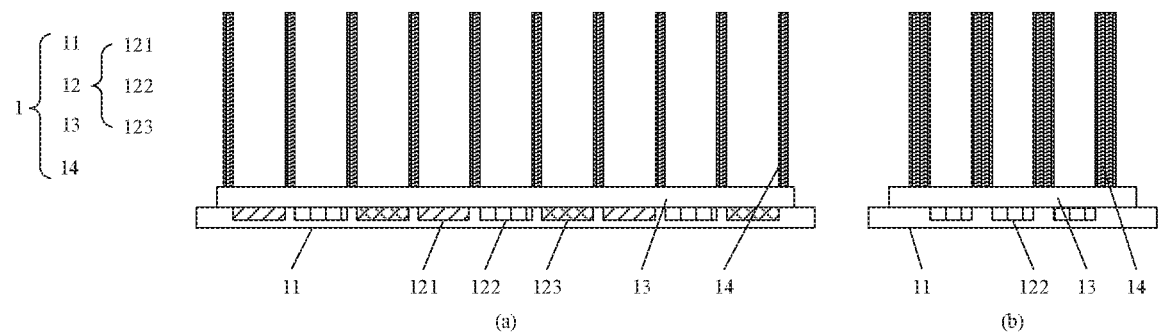
FIG. 2 is a schematic view of a first type of the color film substrate provided by one embodiment of the present application.

In one embodiment of the present application, referring to FIG. 2, all the black matrix walls 14 have the same height, and the height is a threshold height. The black matrix walls 14 constitute a three-dimensional honeycomb-like structure.

All the black matrix walls 14 of this embodiment play the main supporting role in the display panel, and the three-dimensional honeycomb-like structure gives the black matrix walls 14 a stronger geometric structure. That is, the black matrix walls 14 of this embodiment have a structure with a very strong supporting capacity. When subjected to external pressure, the black matrix walls have excellent supporting effect on the array substrate and the color film substrate.

The heights of all the black matrix walls 14 reach the threshold value. Each holding chamber is limited to a space corresponding to an area of one sub-pixel. The range of movement and offset of the liquid crystals can only be fixed in the small space of the holding chamber. When subjected to external pressure, the liquid crystals can be excellently fixed, so the possibility of the displacement of the liquid crystals is very small, and the problem of the uneven cell gap caused by the displacement of the liquid crystals can be solved.

The heights of all the black matrix walls 14 are set to the threshold value, so the transverse refraction of light can be blocked well, and the problem of the color deviation of the liquid crystal display panel can be effectively solved.

Figure 3:
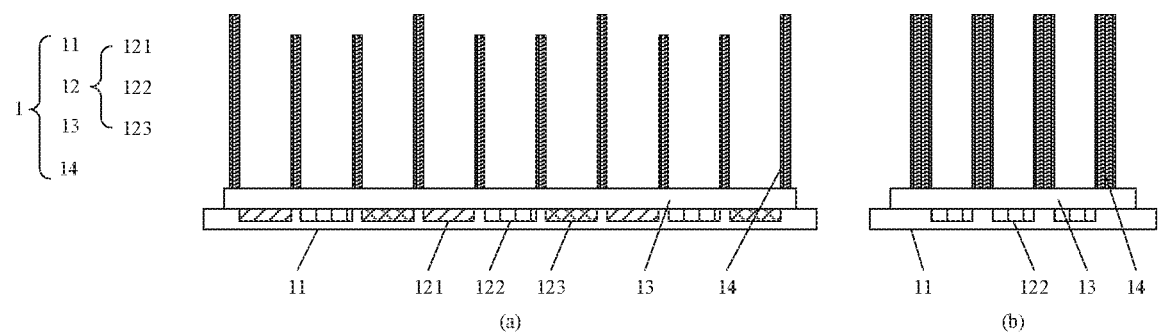
FIG. 3 is a schematic view of a second type of the color film substrate provided by one embodiment of the present application.

In one embodiment of the present application, referring to FIG. 3, the black matrix walls 14 around all the pixel units have the same height, which reaches the threshold height. The black matrix walls 14 between the sub-pixels of all the pixel units have the same height, which is less than the threshold height.

Compared with the embodiment shown in FIG. 2, the embodiment shown in FIG. 3 reduces the height of the black matrix walls 14 between the sub-pixels of all the pixel units, thereby reducing the use of the material of the black matrix walls 14. The black matrix walls 14 around all the pixel units can play a main supporting role in the display panel, and the black matrix walls 14 between the sub-pixels of all the pixel units can play an auxiliary supporting role, so this three-dimensional honeycomb-like structure is still a strong geometric structure. When subjected to external pressure, the black matrix walls 14 playing the main supporting role and playing the auxiliary supporting role can provide the effect of the double support for the array substrate and the color film substrate.

Compared with the embodiment shown in FIG. 2, the embodiment shown in FIG. 3 reduces the height of the black matrix walls 14 between the sub-pixels of all the pixel units, so the space limited by each holding chamber becomes larger. Specifically, the range of the liquid crystals in an upper part of the limited space of the same pixel unit is increased, and may be increased to one pixel unit area. Namely, the liquid crystals in an upper part of the limited space of the same pixel unit can flow in one pixel unit area. But the liquid crystals in a lower part of the limited space are limited in one sub-pixel area. When subjected to pressure, the black matrix walls 14 described in the embodiment of FIG. 3 can still fix the liquid crystals well and prevent them from migrating in a large range, thus solving the problem of uneven cell gap existing in the liquid crystal display panel.

Compared with the embodiment shown in FIG. 2, in the embodiment shown in FIG. 3, the heights of the black matrix walls 14 around all the pixel units are set to the threshold height. This will block the transverse refraction of light well. Moreover, the heights of the black matrix walls 14 between the sub-pixels of all the pixel units are set to be less than the threshold height. This will also block the transverse refraction of a partial light effectively. Thus the problem of the color deviation of the liquid crystal display panel can be effectively solved.

Figure 4:
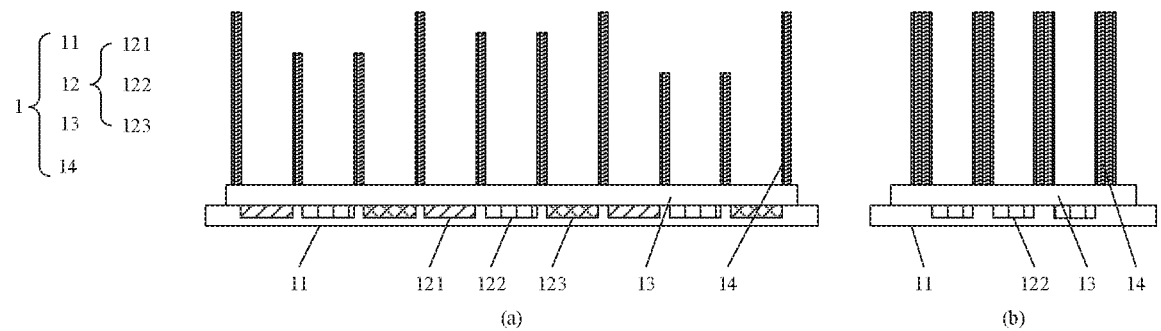
FIG. 4 is a schematic view of a third type of the color film substrate provided by one embodiment of the present application.

In one embodiment of the application, referring to FIG. 4, the black matrix walls 14 around all the pixel units have the same height, which reaches the threshold height. The black matrix walls 14 between the sub-pixels in the same pixel unit have the same height, which is less than the threshold height. But in at least two pixel units, the heights of the black matrix walls 14 between the sub-pixels of which are different.

Figure 5:
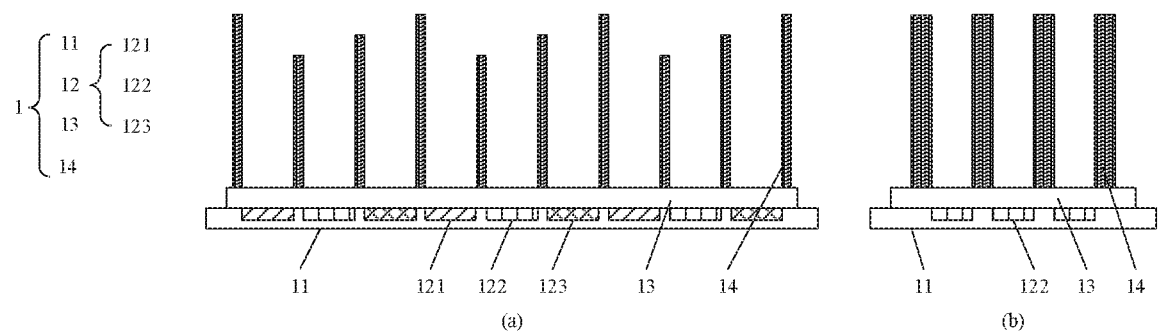
FIG. 5 is a schematic view of a fourth type of the color film substrate provided by one embodiment of the present application.

In one embodiment of the application, referring to FIG. 5, the black matrix walls 14 around all the pixel units have the same height, which are set to the threshold height. In at least one pixel unit, the heights of the black matrix walls 14 between the sub-pixels thereof are different. But in all the pixel units, the heights of the black matrix walls 14 between two fixed sub-pixels are the same.

Figure 6:
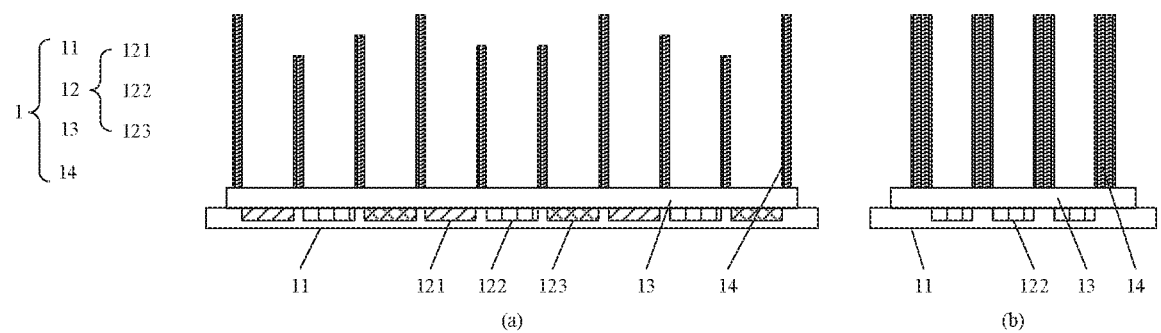
FIG. 6 is a schematic view of a fifth type of the color film substrate provided by one embodiment of the present application.

In one embodiment of the application, referring to FIG. 6, the black matrix walls 14 around all the pixel units have the same height, which are set to the threshold height. In at least one pixel unit, the heights of the black matrix walls 14 between the sub-pixels thereof are different. In at least two pixel units, the heights of the black matrix walls 14 between two fixed sub-pixels are different.

Figure 7:
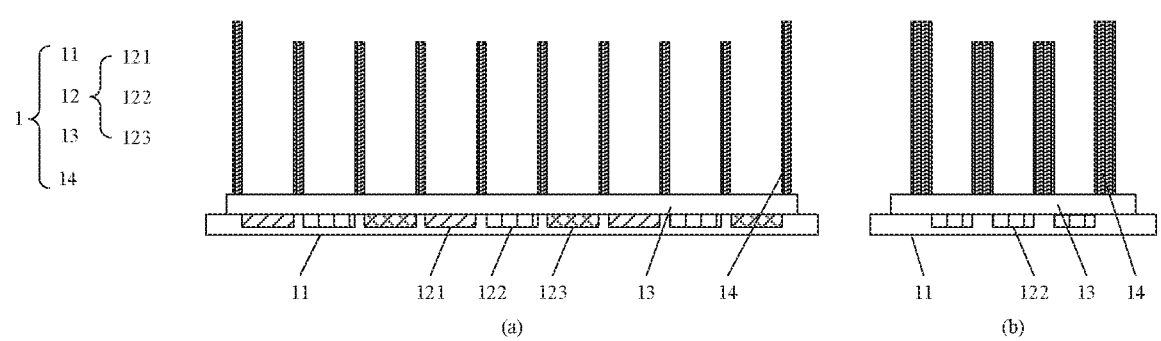
FIG. 7 is a schematic view of a sixth type of the color film substrate provided by one embodiment of the present application.
Figure 8:
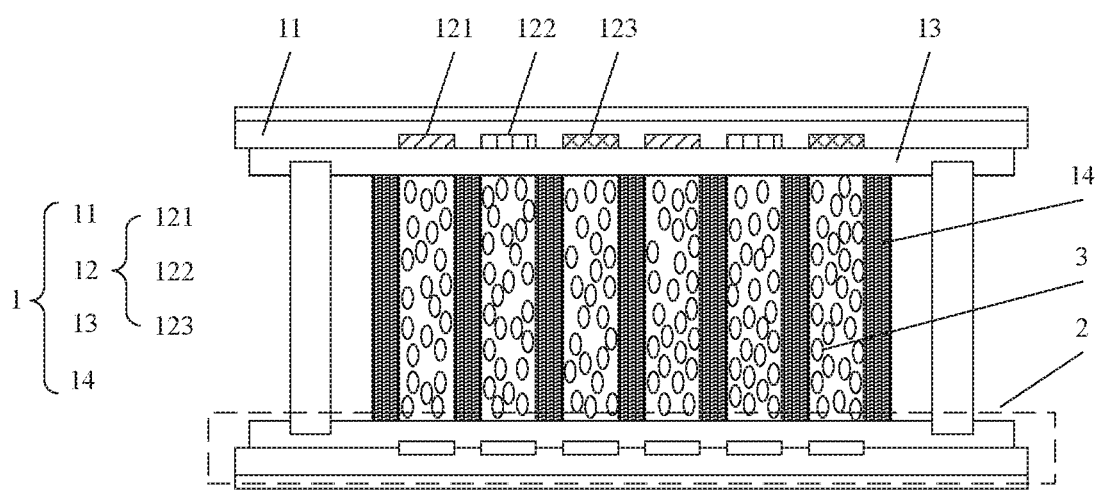
FIG. 8 is a structure schematic view of a flexible liquid crystal display panel provided by one embodiment of the present application.

In one embodiment of the application, referring to FIG. 7, in at least one pixel unit, the heights of the black matrix walls 14 around the pixel unit are different. That is, the height of at least one black matrix wall around the pixel unit is different from that of the other black matrix wall around the pixel unit.

The present application also provides the flexible liquid crystal display panel, including the color film substrate, the array substrate, and the liquid crystals accommodated in the holding chambers of the black matrix walls of the color film substrate. The color film substrate includes the flexible substrate, the photoresist layer, the alignment layer and the black matrix walls. The color film substrate disposes the three-dimensions black matrix walls with the holding chambers to fix the liquid crystals into the holding chambers, thereby preventing the random flow and deviation of the liquid crystals and avoiding the uneven cell gap caused by the deviation of the liquid crystals. Namely, this application can solve the problem of serious displacement of the liquid crystals in the existing flexible liquid crystal display panels.

Referring to FIG. 9, the application provides a preparation method of a color film substrate, including the following step:

providing a flexible substrate 11, as shown in a picture (a) of FIG. 9;

preparing a photoresist layer 12 on the flexible substrate 11; the photoresist layer 12 includes a first sub-pixel 121, a second sub-pixel 122 and a third sub-pixel 123, which are set repeatedly in turn on the same layer; a schematic structure of the photoresist layer 12 is shown in a picture (b) of FIG. 9;

preparing an alignment layer 13 on one side of the photoresist layer 12 away from the flexible substrate 11; a schematic structure thereof is shown in a picture (c) of FIG. 9; and preparing black matrix walls 14 on one side of the alignment layer 13 away from the photoresist layer 12; a schematic structure thereof is shown in a picture (d) of FIG. 9.

Moreover, referring to FIG. 10, the application further provides a preparation method of a flexible liquid crystal display panel, including the steps of preparing a color film substrate 1, preparing an array substrate 2 and combining the color film substrate and the array substrate.

The specific step of preparing the color film substrate includes:

S11 is to provide a flexible substrate;

S12 is to prepare a photoresist layer (or named a pixel layer) on the flexible substrate;

S13 is to prepare an alignment layer on one side of the photoresist layer away from the flexible substrate;

S14 is to prepare black matrix walls on one side of the alignment layer away from the photoresist layer; and S15 is to inject liquid crystals into holding chambers of the black matrix walls.

The black matrix walls can be prepared after the preparation of the photoresist layer is completed. This can avoid the formation of "bull horn" on the black matrix walls, which causes the surface unevenness and affects the subsequent supporting structure. Moreover, in the application, the preparation process of the color film substrate simplifies the preparation process of the existing color film substrate.

The specific step of preparing the array substrate includes:

S21 is to provide a flexible substrate;

S22 is to prepare films in turn on the flexible substrate;

S23 is to prepare an alignment layer on one side of the films away from the flexible substrate;

S24 is to coat a sealant for a frame.

The specific step of combining the color film substrate and the array substrate includes:

combining the prepared color film substrate and the prepared array substrate together.

According to the above-mentioned embodiments, it can be seen that:

the present application provides the color film substrate, the flexible liquid crystal display panel and the preparation method. The color film substrate includes the flexible substrate, the photoresist layer, the alignment layer and the black matrix walls. By disposing the three-dimensional black matrix walls with the liquid crystal-holding chambers on the color film substrate, the liquid crystals can be fixed in the holding chambers, for preventing the random flow and displacement of the liquid crystals and avoiding the uneven cell gap caused by the displacement of the liquid crystals. Thus, the application solves the problem that the existing flexible liquid crystal display panel has severe displacement of liquid crystals under stress.

As described above, although the application has been disclosed in the preferred embodiments as above, the preferred embodiments mentioned above are not intended to limit the application. The ordinary technical personnel in the field may make various changes and embellishments without departing from the spirit and scope of the application. Therefore, the scope of protection of the application is subject to the scope defined by the claims.

What is claimed is:

1. A color film substrate, comprising:
a flexible substrate;
a photoresist layer, being formed on the flexible substrate;
an alignment layer, being located on one side of the photoresist layer away from the flexible substrate; and
black matrix walls, being located on one side of the alignment layer away from the photoresist layer; wherein a height of at least one black matrix wall reaches a threshold height; the black matrix walls constituting a three-dimensional structure and forming holding chambers;
the black matrix walls around at least one pixel unit being higher than the black matrix walls between sub-pixels of the pixel unit;
wherein the black matrix walls around all the pixel units have the same height; the black matrix walls between the sub-pixels of each pixel unit have the same height; and in at least two pixel units, the black matrix walls between the sub-pixels of the two pixel units have different heights.

2. A color film substrate, comprising:
a flexible substrate;
a photoresist layer, being formed on the flexible substrate;
an alignment layer, being located on one side of the photoresist layer away from the flexible substrate; and
black matrix walls, being located on one side of the alignment layer away from the photoresist layer; wherein a height of at least one black matrix wall reaches a threshold height; the black matrix walls constituting a three-dimensional structure and forming holding chambers;
the black matrix walls around at least one pixel unit being higher than the black matrix walls between sub-pixels of the pixel unit;
wherein the black matrix walls around all the pixel units have the same height; and in at least one pixel unit, the black matrix walls between the sub-pixels thereof have different heights.

3. The color film substrate as claimed in claim 2, wherein in all the pixel units, heights of the black matrix walls between two fixed sub-pixels are the same.

4. The color film substrate as claimed in claim 2, wherein in at least two pixel units, heights of the black matrix walls between two fixed sub-pixels of the two pixel units are different.

5. A flexible liquid crystal display panel, including an array substrate, a color film substrate and liquid crystals received in holding chambers of black matrix walls of the color film substrate; the color film substrate including:
a flexible substrate;
a photoresist layer, being formed on the flexible substrate;
an alignment layer, being located on one side of the photoresist layer away from the flexible substrate; and
the black matrix walls, being located on one side of the alignment layer away from the photoresist layer; wherein at least one black matrix wall has a threshold height; the black matrix walls constituting a three-dimensional structure and forming the holding chambers;

the black matrix walls around at least one pixel unit being higher than the black matrix walls between sub-pixels of the pixel unit;

wherein the black matrix walls around all the pixel units have the same height; the black matrix walls between the sub-pixels of each pixel unit have the same height; and in at least two pixel units, the black matrix walls between the sub-pixels of the two pixel units have different heights.

6. A flexible liquid crystal display panel, including an array substrate, a color film substrate and liquid crystals received in holding chambers of black matrix walls of the color film substrate; the color film substrate including:

a flexible substrate;

a photoresist layer, being formed on the flexible substrate;

an alignment layer, being located on one side of the photoresist layer away from the flexible substrate; and the black matrix walls, being located on one side of the alignment layer away from the photoresist layer; wherein at least one black matrix wall has a threshold height; the black matrix walls constituting a three-dimensional structure and forming the holding chambers;

the black matrix walls around at least one pixel unit being higher than the black matrix walls between sub-pixels of the pixel unit;

wherein the black matrix walls around all the pixel units have the same height; and in at least one pixel unit, the black matrix walls between the sub-pixels thereof have different heights.

7. The flexible liquid crystal display panel as claimed in claim 6, wherein in all the pixel units, heights of the black matrix walls between two fixed sub-pixels are the same.

8. The flexible liquid crystal display panel as claimed in claim 6, wherein in at least two pixel units, heights of the black matrix walls between two fixed sub-pixels of the two pixel units are different.

* * * * *